US012609106B2

(12) United States Patent
Datta et al.

(10) Patent No.: US 12,609,106 B2
(45) Date of Patent: Apr. 21, 2026

(54) EMOTIVE TEXT-TO-SPEECH WITH AUTO DETECTION OF EMOTIONS

(71) Applicant: Google LLC, Mountain View, CA (US)

(72) Inventors: Arindrima Datta, New York, NY (US); Rakesh Narayan Iyer, Mountain View, CA (US)

(73) Assignee: Google LLC, Mountain View, CA (US)

( * ) Notice: Subject to any disclaimer, the term of this patent is extended or adjusted under 35 U.S.C. 154(b) by 101 days.

(21) Appl. No.: 18/544,354

(22) Filed: Dec. 18, 2023

(65) Prior Publication Data

US 2025/0201233 A1 Jun. 19, 2025

(51) Int. Cl.

*G10L 13/08* (2013.01)
*G10L 13/10* (2013.01)
*G10L 25/30* (2013.01)
*G10L 25/63* (2013.01)

(52) U.S. Cl.

CPC .............. *G10L 13/08* (2013.01); *G10L 13/10* (2013.01); *G10L 25/63* (2013.01); *G10L 25/30* (2013.01)

(58) Field of Classification Search

CPC ......... G10L 13/08; G10L 13/10; G10L 25/30; G10L 25/63
USPC .................................................. 704/260, 266
See application file for complete search history.

(56) References Cited

U.S. PATENT DOCUMENTS

2018/0286383 A1* 10/2018 Barari .................. G10L 13/033
2021/0287657 A1* 9/2021 Deng ...................... G06F 40/30
2021/0350795 A1* 11/2021 Kenter .................... G10L 15/02
2022/0129621 A1* 4/2022 Guda ...................... G06F 18/24
2023/0099732 A1* 3/2023 Mukherjee ........... G06N 3/0442 704/258
2023/0252972 A1* 8/2023 Harazi .................... G10L 25/63 704/259

(Continued)

FOREIGN PATENT DOCUMENTS

CN 116704998 A * 9/2023 ............ G10L 13/02

OTHER PUBLICATIONS

Feng, Yujie, et al. "Towards LLM-driven dialogue state tracking." arXiv preprint arXiv:2310.14970. Oct. 2023, pp. 1-17. (Year: 2023).*

(Continued)

*Primary Examiner* — James S Wozniak
(74) *Attorney, Agent, or Firm* — Honigman LLP; Brett A. Krueger; Grant Griffith

(57) ABSTRACT

A method of providing emotive text-to-speech includes obtaining input text characterizing a natural language response generated by an assistant LLM to a query input by a user during a conversation between the user and the assistant LLM, and processing, using the assistant LLM, the input text conditioned on an emotion detection task prompt to predict, as output from the assistant LLM, an emotional state of the natural language response. The method also includes determining, based on the emotional state of the natural language response predicted as output from the assistant LLM, an emotional embedding for the input text and instructing a TTS model to process the input text and the emotional embedding to generate a synthesized speech representation of the natural language response conveying the emotional state of the natural language response as specified by the emotional embedding.

14 Claims, 7 Drawing Sheets

(56) References Cited

U.S. PATENT DOCUMENTS

| | | | | |
|---|---|---|---|---|
| 2023/0298580 | A1* | 9/2023 | Plauché | G06F 16/685 704/235 |
| 2023/0351120 | A1* | 11/2023 | Gelfenbeyn | G06N 3/006 |
| 2024/0087597 | A1* | 3/2024 | Byun | G10L 13/033 |
| 2025/0166601 | A1* | 5/2025 | Min | G10L 13/033 |
| 2025/0182751 | A1* | 6/2025 | Koneru | G10L 15/183 |
| 2025/0193462 | A1* | 6/2025 | Govindarajan | G06Q 50/01 |
| 2025/0200855 | A1* | 6/2025 | Park | G06T 13/40 |

OTHER PUBLICATIONS

Gong, Yuan, et al. "Joint audio and speech understanding." 2023 IEEE Automatic Speech Recognition and Understanding Workshop (ASRU). IEEE, Dec. 2023, pp. 1-8. (Year: 2023).*

Jiang, Ziyue, et al. "Mega-tts: Zero-shot text-to-speech at scale with intrinsic inductive bias." arXiv preprint arXiv:2306.03509. Jun. 2023, pp. 1-20. (Year: 2023).*

Ng, Dianwen, et al. "Self-Tailoring Prompts for Parameter Efficient Tuning Speech Recognition." Openreview.net, Sep. 2023, pp. 1-16. (Year: 2023).*

Saito, Yuki, et al. "Chatgpt-edss: Empathetic dialogue speech synthesis trained from chatgpt-derived context word embeddings." arXiv preprint arXiv:2305.13724. May 2023, pp. 1-5. (Year: 2023).*

Zhang, Hanglei, et al. "Expressive tts driven by natural language prompts using few human annotations." arXiv preprint arXiv:2311.01260, Nov. 2023, pp. 1-5. (Year: 2023).*

Zhou, Xinyu, et al. "Towards joint modeling of dialogue response and speech synthesis based on large language model." arXiv preprint arXiv:2309.11000. Sep. 2023, pp. 1-8. (Year: 2023).*

Liu Yuchen et al: "Emotionally Situated Text-to-Speech Synthesis in User-Agent Conversation", Proceedings of the 31st ACM International Conference on Multimedia, ACMPUB27, New York, NY, USA, Oct. 26, 2023, (Oct. 26, 2023), pp. 5966-5974, XP059392649.

Ma Yukun et al: "A Survey on Empathetic Dialogue Systems", Information Fusion, vol. 64, Jun. 25, 2020 (Jun. 25, 2020), pp. 50-70, XP055835654.

International Search Report and Written Opinion issued in related PCT Application NO. PCT/US2024/056661, dated Jan. 21, 2025.

* cited by examiner

EMOTIVE TEXT-TO-SPEECH WITH AUTO DETECTION OF EMOTIONS

TECHNICAL FIELD

This disclosure relates to emotive text-to-speech (TTS) with auto detection of emotions.

BACKGROUND

Large language models (LLMs) are increasingly used to provide conversational experiences between users and digital assistant interfaces executing on user devices. Generally, when a user provides a request/query to a digital assistant interface powered by an LLM, the resulting response generated by the LLM and reproduced as synthesized speech to audibly convey the response, is generally devoid of emotions, sounding monotonic and unnatural. However, when used for a personal assistant or content narration, injecting emotion into generated speech significantly improves the user experience. Previous solutions have attempted to manually dictate emotions into generated speech. Alternatively, highly specialized speech generation modules (e.g., for reading news, kids stories, etc.) are used. In both of these solutions, however, the ever-increasing volume of synthesized speech and the introduction of newer voice-first technologies requires a cost-prohibitive amount of annotated data and time.

SUMMARY

One aspect of the disclosure provides a computer-implemented method that when executed on data processing hardware causes the data processing hardware to perform operations that include obtaining input text characterizing a natural language response generated by an assistant large language model (LLM) to a query input by a user during a conversation between the user and the assistant LLM, and processing, using the assistant LLM, the input text conditioned on an emotion detection task prompt to predict, as output from the assistant LLM, an emotional state of the natural language response. Here, the emotion detection task prompt specifies a task for the assistant LLM to detect an emotional state of the input text from a set of possible emotional states. The operations also include determining, based on the emotional state of the natural language response predicted as output from the assistant LLM, an emotional embedding for the input text. The emotional embedding specifies the emotional state of the natural language response for synthesizing the input text into expressive speech. The operations further include instructing a text-to-speech (TTS) model to process the input text and the emotional embedding to generate a synthesized speech representation of the natural language response. Here, the synthesized speech representation conveys the emotional state of the natural language response as specified by the emotional embedding.

Implementations of the disclosure may include one or more of the following optional features. In some implementations, the operations further include receiving audio data characterizing an utterance of the query spoken by the user in natural language and captured by a user device, and performing speech recognition on the audio data to generate a textual representation of the query spoken by the user. In some examples, the operations further include receiving one or more few-shot learning examples each depicting an example text input paired with a ground-truth emotional state classification of the example text input. Each few-shot learning example provides in-context learning for enabling the assistant LLM to generalize for the task of detecting emotional states of input texts. In these examples, processing the input text conditioned on the emotion detection task prompt to predict the emotional state of the natural language prompt includes processing, using the assistant LLM, the input text conditioned on the emotion detection task prompt and the one or more few-shot learning examples to predict, as output from the assistant LLM, the emotional state of the natural language response.

In some implementations, the operations further include receiving a fine-tuned prompt embedding. The fine-tuned prompt embedding includes a soft prompt configured to guide the assistant LLM to detect the emotional state of the input text from the set of possible emotional states while parameters of the assistant LLM are held fixed. In these implementations, processing the input text conditioned on the emotion detection task prompt to predict the emotional state of the natural language prompt includes processing, using the assistant LLM, the input text conditioned on the emotion detection task prompt and the fine-tuned prompt embedding to predict, as output from the assistant LLM, the emotional state of the natural language response. In these implementations, the fine-tuned prompt embedding may be learned during a prompt embedding fine-tuning process. The fine-tuning process includes initializing a prompt embedding as fixed-length sequence of learnable vectors, and receiving a training dataset of natural language training utterances. Each natural language training utterance includes a corresponding textual representation of the natural language training utterance, and a corresponding ground-truth emotional state of the natural language training utterance. For each natural language training utterance in the training data, the operations further include processing, using the assistant LLM, the corresponding textual representation of the natural language training utterance to generate a corresponding predicted emotional state for the natural language training utterance as output from the assistant LLM, determining a training loss based on the corresponding predicted emotional state and the corresponding ground-truth emotional state of the natural language training utterance, and tuning, using the training loss, the prompt embedding by updating the learnable vectors while parameters of the assistant LLM are kept fixed.

In some examples, the assistant LLM includes a pre-trained LLM and a low-rank adaption training process fine-tunes a fraction of parameters of the pre-trained LLM to learn how to predict emotional states of input texts. In these examples, the low-rank adaption training process fine-tunes the fraction of the pre-trained LLM by receiving a training dataset of natural language training utterances. Each natural language training utterance including a corresponding textual representation of the natural language training utterance, and a corresponding ground-truth emotional state of the natural language training utterance. For each natural language training utterance in the training dataset, the operations further include processing, using the assistant LLM, the corresponding textual representation of the natural language training utterance to generate a corresponding predicted emotional state for the natural language training utterance as output from the assistant LLM, and determining a training loss based on the corresponding predicted emotional state and the corresponding ground-truth emotional state of the natural language training utterance. The operations further include fine-tuning, using the training losses, the fraction of the parameters of the assistant LLM while a remaining portion of the parameters of the assistant LLM are kept fixed.

In some implementations, obtaining the input text characterizing the natural language response includes processing, using the assistant LLM, a textual representation of the query input by the user to generate, as output from the assistant LLM, the input text characterizing the natural language response to the query, and processing the input text conditioned on the emotion detection task prompt to predict the emotional state of the natural language response includes, after the input text characterizing the natural language response to the query is output from the assistant LLM and provided as feedback to the assistant LLM, processing, using the assistant LLM, the input text conditioned on the emotion detection prompt to predict, as output from the assistant LLM, the emotional state of the natural language response. In some examples, obtaining the input text characterizing the natural language response includes processing, using the assistant LLM, a textual representation of the query input by the user to generate the input text characterizing the natural language response to the query. Here, processing the input text conditioned on the emotion detection task prompt to predict the emotional state of the natural language response includes processing, using the assistant LLM, the input text conditioned on the emotion detection task prompt to predict the emotional state of the natural language response and generate, as output, from the assistant LLM, marked-up text that includes the input text characterizing the natural language response annotated with the predicted emotional state of the natural language response. In some implementations, determining the emotional embedding specifying the emotional state of the natural language response for synthesizing the input text into expressive speech includes accessing a two-dimensional embedding space that maps each respective emotional state from the set of possible emotional states to a different respective emotional embedding.

Another aspect of the disclosure provides a system including data processing hardware and memory hardware in communication with the data processing hardware. The memory hardware stores instructions that when executed by the data processing hardware cause the data processing hardware to perform operations that include obtaining input text characterizing a natural language response generated by an assistant large language model (LLM) to a query input by a user during a conversation between the user and the assistant LLM, and processing, using the assistant LLM, the input text conditioned on an emotion detection task prompt to predict, as output from the assistant LLM, an emotional state of the natural language response. Here, the emotion detection task prompt specifies a task for the assistant LLM to detect an emotional state of the input text from a set of possible emotional states. The operations also include determining, based on the emotional state of the natural language response predicted as output from the assistant LLM, an emotional embedding for the input text. The emotional embedding specifies the emotional state of the natural language response for synthesizing the input text into expressive speech. The operations further include instructing a text-to-speech (TTS) model to process the input text and the emotional embedding to generate a synthesized speech representation of the natural language response. Here, the synthesized speech representation conveys the emotional state of the natural language response as specified by the emotional embedding.

This aspect may include one or more of the following optional features. In some implementations, the operations further include receiving audio data characterizing an utterance of the query spoken by the user in natural language and captured by a user device, and performing speech recognition on the audio data to generate a textual representation of the query spoken by the user. In some examples, the operations further include receiving one or more few-shot learning examples each depicting an example text input paired with a ground-truth emotional state classification of the example text input. Each few-shot learning example provides in-context learning for enabling the assistant LLM to generalize for the task of detecting emotional states of input texts. In these examples, processing the input text conditioned on the emotion detection task prompt to predict the emotional state of the natural language prompt includes processing, using the assistant LLM, the input text conditioned on the emotion detection task prompt and the one or more few-shot learning examples to predict, as output from the assistant LLM, the emotional state of the natural language response.

In some implementations, the operations further include receiving a fine-tuned prompt embedding. The fine-tuned prompt embedding includes a soft prompt configured to guide the assistant LLM to detect the emotional state of the input text from the set of possible emotional states while parameters of the assistant LLM are held fixed. In these implementations, processing the input text conditioned on the emotion detection task prompt to predict the emotional state of the natural language prompt includes processing, using the assistant LLM, the input text conditioned on the emotion detection task prompt and the fine-tuned prompt embedding to predict, as output from the assistant LLM, the emotional state of the natural language response. In these implementations, the fine-tuned prompt embedding may be learned during a prompt embedding fine-tuning process. The fine-tuning process includes initializing a prompt embedding as fixed-length sequence of learnable vectors, and receiving a training dataset of natural language training utterances. Each natural language training utterance includes a corresponding textual representation of the natural language training utterance, and a corresponding ground-truth emotional state of the natural language training utterance. For each natural language training utterance in the training data, the operations further include processing, using the assistant LLM, the corresponding textual representation of the natural language training utterance to generate a corresponding predicted emotional state for the natural language training utterance as output from the assistant LLM, determining a training loss based on the corresponding predicted emotional state and the corresponding ground-truth emotional state of the natural language training utterance, and tuning, using the training loss, the prompt embedding by updating the learnable vectors while parameters of the assistant LLM are kept fixed.

In some examples, the assistant LLM includes a pre-trained LLM and a low-rank adaption training process fine-tunes a fraction of parameters of the pre-trained LLM to learn how to predict emotional states of input texts. In these examples, the low-rank adaption training process fine-tunes the fraction of the pre-trained LLM by receiving a training dataset of natural language training utterances. Each natural language training utterance including a corresponding textual representation of the natural language training utterance, and a corresponding ground-truth emotional state of the natural language training utterance. For each natural language training utterance in the training dataset, the operations further include processing, using the assistant LLM, the corresponding textual representation of the natural language training utterance to generate a corresponding predicted emotional state for the natural language training utterance as output from the assistant LLM, and determining a training loss based on the corresponding predicted emotional state and the corresponding ground-truth emotional state of the natural language training utterance. The operations further include fine-tuning, using the training losses, the fraction of the parameters of the assistant LLM while a remaining portion of the parameters of the assistant LLM are kept fixed.

In some implementations, obtaining the input text characterizing the natural language response includes processing, using the assistant LLM, a textual representation of the query input by the user to generate, as output from the assistant LLM, the input text characterizing the natural language response to the query, and processing the input text conditioned on the emotion detection task prompt to predict the emotional state of the natural language response includes, after the input text characterizing the natural language response to the query is output from the assistant LLM and provided as feedback to the assistant LLM, processing, using the assistant LLM, the input text conditioned on the emotion detection prompt to predict, as output from the assistant LLM, the emotional state of the natural language response. In some examples, obtaining the input text characterizing the natural language response includes processing, using the assistant LLM, a textual representation of the query input by the user to generate the input text characterizing the natural language response to the query. Here, processing the input text conditioned on the emotion detection task prompt to predict the emotional state of the natural language response includes processing, using the assistant LLM, the input text conditioned on the emotion detection task prompt to predict the emotional state of the natural language response and generate, as output, from the assistant LLM, marked-up text that includes the input text characterizing the natural language response annotated with the predicted emotional state of the natural language response. In some implementations, determining the emotional embedding specifying the emotional state of the natural language response for synthesizing the input text into expressive speech includes accessing a two-dimensional embedding space that maps each respective emotional state from the set of possible emotional states to a different respective emotional embedding.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Humans may engage in human-to-computer dialogs with interactive software applications referred to as "chatbots," "voice bots", "automated assistants", "interactive personal assistants," "intelligent personal assistants," "conversational agents," etc. via a variety of computing devices. As one example, these chatbots may correspond to a machine learning model or a combination of different machine learning models, and may be utilized to perform various tasks on behalf of users.

Chatbots adopting Large language models (LLMs) are currently opening up a wide range of applications due to their powerful understanding and generation capabilities which can operate over text, image, and/or audio inputs. These models are also being extended with actuation capabilities via integration mechanisms with various service providers.

LLMs are increasingly used to provide conversational experiences between users and digital assistant interfaces executing on user devices. Generally, when a user provides a request/query to a digital assistant interface powered by an LLM, the resulting synthesized speech produced for the response generated by the LLM lacks any emotion for a typical turn in a conversation. However, in spoken conversations where the user speaks an input query/request and synthesized speech conveying the response generated by the LLM is audibly output, the user experience is hurt since the synthesized speech conveying the response to the query is monotonic and unnatural to the user.

Figure 1:
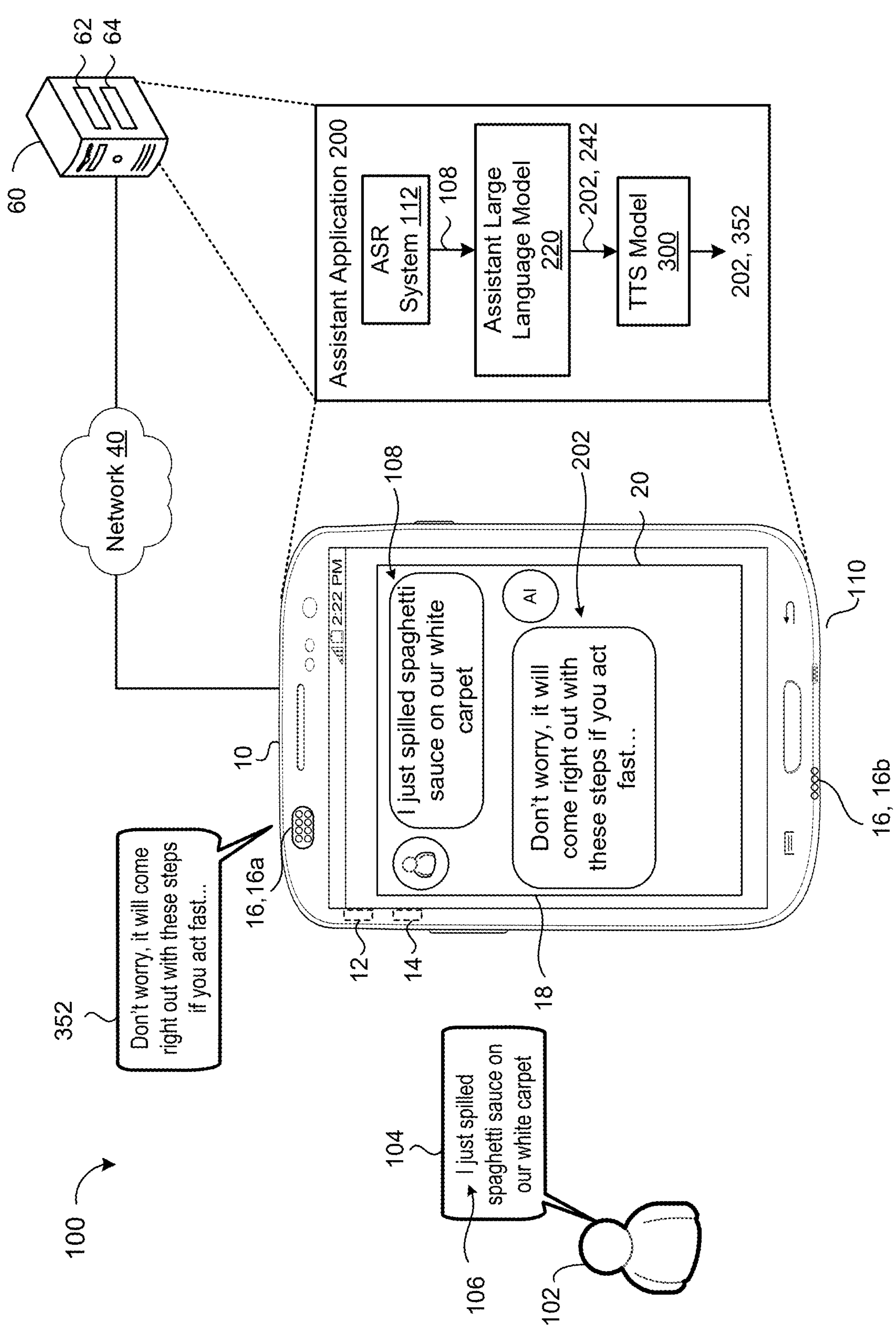
FIG. 1 is an example environment using an assistant large language model (LLM) including an emotive text-to-speech (TTS) system.

FIG. 1 illustrates an example system 100 for allowing a spoken conversation between a user 102 and an assistant LLM 220. A conversational assistant application 200 may execute on a user device 10 associated with the user 102 and/or a remote system 60 in communication with the user device 10 via a network 40 to enable the user 102 and the assistant LLM 220 to interact with one another through spoken conversation. The conversational assistant application 200 may access various components for facilitating the spoken conversation in a natural manner between the user 102 and the assistant LLM 220. For instance, through the use of application programming interfaces (APIs) or other types of plug-ins, the conversational assistant application 200 may access an automated speech recognition (ASR) system 112, a prompt structurer 210 (FIG. 2), the assistant LLM 220, a text-to-speech (TTS) model 300, and a user interface 20.

During a user turn of the spoken conversation between the user 102 and the conversational assistant application 200 (i.e., the assistant LLM 220), the user device 10 captures audio data characterizing an utterance 104 of a query 106 spoken by the user 102 and directed toward the conversational assistant application 200 to solicit a response from the assistant LLM 220. For instance, the query 106 may specify a particular question that the user 102 would like the assistant LLM 220 to answer and the assistant LLM 220 may generate a response that answers the question. For example, the assistant LLM 220 generates input text 202 characterizing a natural language response generated by the assistant LLM 220 to the query 106 input by the user 102. The query 106 may similarly correspond to a request for information and the assistant LLM 220 may generate the input text 202 as the response conveying the requested information. While the term query 106 is used, the query 106 may correspond to any natural language dialog (e.g., a greeting) directed toward the assistant LLM 220 during the user's turn in the spoken conversation between the user 102 and the assistant LLM 220. The user 102 may speak the utterance of the query 106 in natural language and the ASR system 112 may perform speech recognition on the audio data characterizing the utterance 104 of the query 106 to generate a textual representation 108 of the query 106 spoken by the user 102. The textual representation 108 of the query 106 may be simply referred to as a textual query 108.

Figure 2:
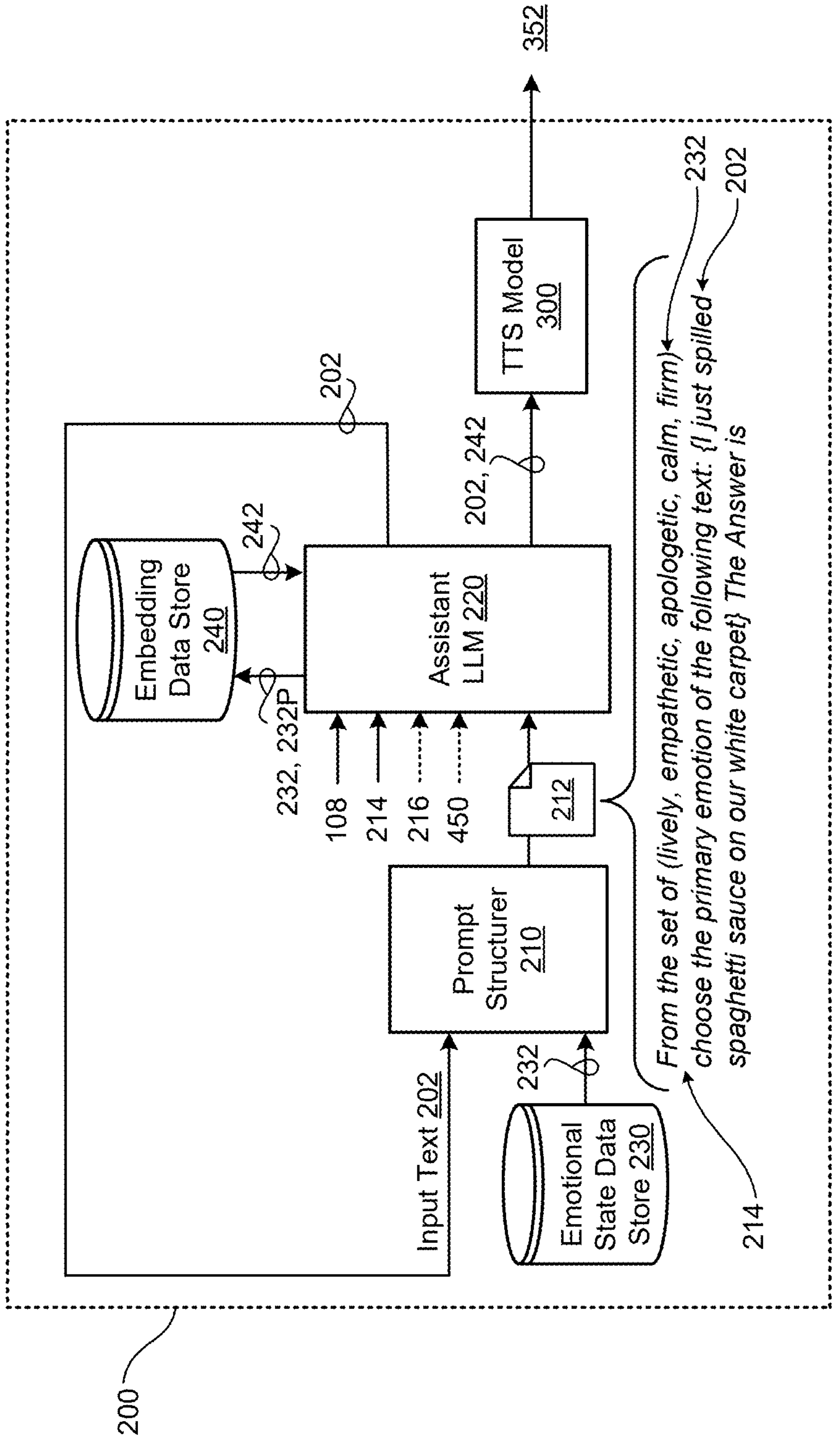
FIG. 2 is a schematic view of example components of the assistant LLM.

Referring to FIG. 2, during a first round trip, the conversational assistant application 200 feeds the textual query 108 to the assistant LLM 220 to enable the assistant LLM 220 to perform the task of generating input text 202 characterizing a natural language response to the user's query 106. Thereafter, the prompt structurer 210 receives the input text 202 output by the assistant LLM 220 and structures an emotion prompt 212 by conditioning the input text 202 on an emotion detection task prompt 214 to predict, as output from the assistant LLM 220, an emotional state 232P of the input text 202 characterizing the natural language response to the textual query 108. Here, the emotion detection task prompt 214 specifies a task for the assistant LLM 220 to detect an emotional state 232P of the input text 202 from a set of possible emotional states 232.

During a second round trip, the assistant LLM 220 performs the task of predicting the emotional state 232P of the input text 202 and then, based on the predicted emotional state 232P of input text 202 characterizing the natural language response, the conversational assistant application 200 determines an emotional embedding 242 specifying the emotional state of the input text 202 characterizing the natural language response for synthesizing the input text 202 into expressive speech, and instructs the TTS model 300 to process the input text 202 and the emotional embedding 242 to generate a synthesized speech representation 352 of the natural language response. Here, the synthesized speech representation 352 conveys the emotional state 232 of the natural language response as specified by the emotional embedding 242. While examples herein depict the same assistant LLM 220 generating the input text 202 characterizing the natural language response to the user's query 106 input to the assistant LLM 220 and detecting the emotional state 232P of the input text 202, other configurations where a two LLMs are utilized: a first LLM that processes the user's query 106 to generate the input text 202 characterizing the natural language response; and a second LLM that processes the input text 202 to predict the emotional state 232P of the input text.

In these implementations, processing the input text 202 conditioned on the emotion detection task prompt 214 to predict the emotional state 232P of the natural language includes the assistant LLM 220 first generating the input text 212 characterizing the natural language response to the query 106 and then providing the input text as feedback to the assistant LLM 220 during the second round trip to predict the emotional state 232P of the natural language response. Alternatively, the assistant LLM 220 performs the task of generating the input text 202 and the task of detecting an emotional state 232 simultaneously such that the input text 202 and the emotional state 232 are generated/output in a single round trip. In these implementations, the assistant LLM 220 obtains the input text 202 characterizing the natural language response by processing the textual representation 108 of the query 106 input by the user 102 to generate the input text 202 characterizing the natural language response to the query 106. Here, the assistant LLM processes the input text 202 conditioned on the emotion detection task prompt 214 to predict the emotional state 232P of the natural language response and generate, as output from the assistant LLM 220, marked-up text that includes the input text 202 characterizing the natural language response annotated with the predicted emotional state 232P of the natural language response.

Referring back to FIG. 1, the system 100 includes the user device 10, a remote computing system 60, and a network 40. The user device 10 includes data processing hardware 12 and memory hardware 14. The user device 10 may include, or be in communication with, an audio system 16*a*, 16*b* (e.g., an array of one or more microphones and/or speakers) for converting utterances of natural language queries 106 spoken by the user 102 into corresponding audio data (e.g., electrical signals or digital data). In lieu of spoken input, the user 103 may input a textual representation of the natural language query 106 via a user interface 20 executing on the user device 10. In scenarios when the user speaks a natural language query 106 captured by the microphone 16*b* of the user device 10, the ASR system 112 executing on the user device 10 or the remote computing system 60 may process the corresponding audio data to generate a transcription of the query 106. Here, the transcription conveys the textual query 106 provided as input to the assistant interface 20. The ASR system 112 may implement any number and/or type(s) of past, current, or future speech recognition systems, models and/or methods including, but not limited to, an end-to-end speech recognition model, such as streaming speech recognition models having recurrent neural network-transducer (RNN-T) model architectures, a hidden Markov model, an acoustic model, a pronunciation model, a language model, and/or a naïve Bayes classifier.

The user device 10 may be any computing device capable of communicating with the remote computing system 60 through the network 40. The user device 10 includes, but is not limited to, desktop computing devices and mobile computing devices, such as laptops, tablets, smart phones, smart speakers/displays, digital assistant devices, smart appliances, internet-of-things (IoT) devices, infotainment systems, vehicle infotainment systems, and wearable computing devices (e.g., headsets, smart glasses, and/or watches).

The remote computing system 60 may be a distributed system (e.g., a cloud computing environment) having scalable elastic resources. The resources include computing resources 62 (e.g., data processing hardware) and/or storage resources 64 (e.g., memory hardware). Additionally or alternatively, the remote computing system 60 may be a centralized system. The network 40 may be wired, wireless, or a combination thereof, and may include private networks and/or public networks, such as the Internet.

With continued reference to FIGS. 1 and 2, the components leveraged by the conversational assistant application 200 may execute on the data processing hardware 12 of the user device 10 or on the data processing hardware 62 of the remote computing system 60. In some implementations, the components leveraged by the conversational assistant application 200 execute on both the data processing hardware 12 of the user device 10 and the data processing hardware 62 of the remote computing system 60. For instance, one or more components of the conversational assistant application 200 may execute on the data processing hardware 12 of the user device 10 while one or more other components of the conversational assistant application 200 may execute on the data processing hardware 62 of the remote computing system 60.

The assistant LLM 220 may power the conversational assistant application 200 to function as a personal chat bot capable of having dialog conversations with the user 102 in natural language and performing tasks/actions on the user's behalf. In some examples, the assistant LLM 220 includes an instance of Bard, LaMDA, BERT, Meena, ChatGPT, or any other previously trained LLM. These LLMs have been previously trained on enormous amounts of diverse data and are capable of engaging in corresponding conversations with users in a natural and intuitive manner. However, these LLMs have a plurality of machine learning (ML) layers and hundreds of millions to hundreds of billions of ML parameters.

By conditioning the input text 202 on the emotion detection task prompt 214 to form the emotion prompt 212, the emotion prompt 212 guides the assistant LLM 220 to detect the emotional state 232 of the input text 202 characterizing the natural language response to the query 106 as opposed to generating input text 202 without any accompanying emotion. Thereafter, the TTS model 300 (FIG. 3) receives the input text 202 and the emotional embedding 242 specifying the emotional state 232 of the natural language, and processes the input text 202 and the emotional embedding 242 to generate the synthesized speech representation 352 having the emotional state 232 specified by the emotional embedding 242. Here, the synthesized speech representation 352 is audibly output from an audio output device (e.g., acoustic speaker) 16*a*. Additionally or alternatively, the conversational assistant application 200 may instruct the user interface 20 to display, on a screen 18 in communication with the user device 10, the input text 202 characterizing the natural language response to the query 106. In this scenario, the assistant application 200 may display an emotional graphic (emoticon) representative of the emotional state 232 specified by the emotional embedding 242. In the example shown, the user 102 speaks the query 106 of "I just spilled spaghetti sauce on our white carpet," the assistant LLM 220 generates input text 202 of "don't worry, it will come right out with these steps if you act fast . . . " and the emotional state 232, and based on an emotional embedding 242 specifying the emotional state 232, the TTS model 300 generates the synthesized speech representation 352 of the input text 202, which may be audibly output and/or displayed in text on the screen 18.

As referenced above, and as shown in FIG. 2, the conversational assistant application 200 includes the prompt structurer 210, the assistant LLM 220, and the TTS model 300, and has access to an emotional state data store 230 and an embedding data store 240 stored on the memory hardware 14, 64. The emotional state data store 230 includes sets of different emotional states 232, while the embedding data store 240 includes a plurality of emotional embeddings 242. Each of the emotional embeddings 242 stored in the data store 240 may be a controllable feature for the TTS model 300 to synthesize speech with different emotional states 232. For example, each emotional state 232 predicted by the assistant LLM 220 is mapped to an emotional embedding 242 within a 2-dimensional (two-dimensional) space. Here, different emotional states 232 (e.g., lively, empathetic, apologetic, calm, firm, etc.) map to corresponding emotional embeddings 242.

The prompt structurer 210 is configured to receive the input text 202 and a set of possible emotional states 232 from the emotional state data store 230 and generate, as output, an emotion prompt 212. The emotion prompt 212 includes the input text 202 conditioned on an emotion detection task prompt 214 that directs the assistant LLM 220 to detect an emotional state 232 of the input text 202 from the set of possible emotional states 232 from the emotional state data store 230. Put another way, the prompt structurer 210 concatenates the emotion detection task prompt 214, the input text 202, and the set of possible emotional states 232 from the emotional state data store 230 to generate the emotion prompt 212 that serves as an instruction to the assistant LLM 220 to detect the emotional state 232 of the input text 202. For example, as shown in FIG. 2, the emotion prompt 212 includes the emotion detection task prompt 214 of "from the set of (<<emotional states>) choose the primary emotion of the following text: {<<input text>>} the answer is" where the emotional states include the set of emotional states 232 of "lively," "empathetic," "apologetic," "calm," and "firm," and the input text includes the input text 202 of "don't worry, it will come right out with these steps if you act fast . . . "

The assistant LLM 220 is configured to receive the emotional prompt 212 and process the input text 202 conditioned on the emotion detection task prompt 214 output by the prompt structurer 210 to predict, as output, an emotional state 232P of the input text 202 (i.e., the natural language response). In some implementations, the assistant LLM 220 also receives, as input, one or more few-shot learning examples 216 that each depict an exemplary text-input paired with a ground-truth emotional state classification of the example text-input. Here, each few-shot learning example 216 provides in-context learning for enabling the assistant LLM 220 to generalize for the task of detecting emotional states of input texts. For example, a few-shot learning example 216 that pairs the example text input of "I'll try to do better, but no promises" with the ground-truth emotional state classification of "firm" and "apologetic." In another example, a few-shot learning example 216 pairs the example text input of "congratulations, I knew you'd be a hit!" with the ground-truth emotional state classification of "lively." Here, processing the input text 202 conditioned on the emotion detection task prompt 214 to predict the emotional state 232 of the natural language prompt includes processing, using the assistant LLM 220, the input text 202 conditioned on the emotion detection task prompt 214 and the one or more few-shot learning examples 216 to predict as output from the assistant LLM 220, the emotional state 232P of the natural language response (i.e., the input text 202). In these implementations, the assistant LLM 220 may be a pre-trained LLM that was never trained on the task of emotion detection, where the few-shot learning examples 216 paired with the input text 202 conditioned on the emotion detection task prompt 214 further aid in guiding the assistant LLM 220 to detect an emotional state of input text as an emerging property of the assistant LLM 220. In some implementations, the few-shot learning examples 216 guide the assistant LLM 220 to generate/detect emotional states of input text without training or updating parameters of the pre-trained assistant LLM 220. The assistant LLM 220 may also include the pre-trained LLM in zero-shot learning examples where emotional prompt 212 is fed to the assistant LLM 220 without any few-shot learning examples 216.

Additionally or alternatively to providing few-shot learning examples 216 with the emotional prompt 212, the assistant LLM 220 also receives, as input, a fine-tuned prompt embedding 450 that includes a soft prompt configured to guide the assistant LLM 220 to detect the emotional state 232P of the input text 202 from the set of possible emotional states 232 while parameters of the assistant LLM 220 are held fixed. Here, processing the input text 202 conditioned on the emotion detection task prompt 214 to predict the emotional state 232P of the natural language prompt includes processing, using the assistant LLM 220, the input text 202 conditioned on the emotion detection task prompt 214 and the fine-tuned prompt embedding 450 to predict, as output from the assistant LLM 220, the emotional state 232P of the natural language response. As will be described in more detail with respect to FIG. 4A, during a training process 400*a*, the fine-tuned prompt embedding 450 is pre-learned during an embedding fine-tuning process and may be stored in the data stores 230, 240. Optionally, the assistant LLM 220 is a pre-trained LLM 220 that is trained using a low-rank adaptation training process 400*b* (FIG. 4B) that fine-tunes a fraction of the parameters of the pre-trained LLM 220 to learn how to predict emotional states of input texts.

Figure 4A:
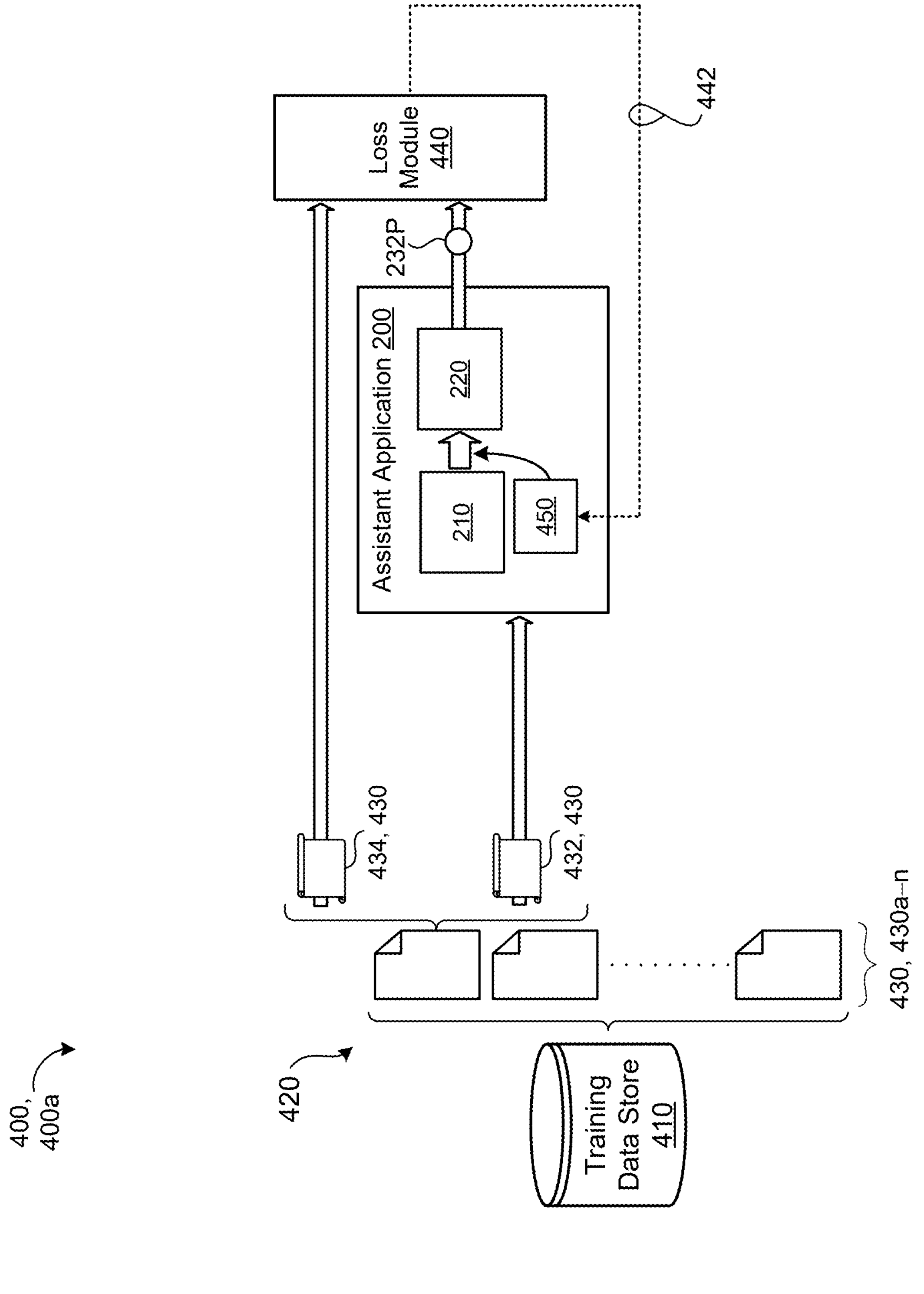
FIG. 4A is a schematic view of an example training process for tuning emotional embeddings.

Referring to FIG. 4A, an example training process 400, 400*a* where the fine-tuned prompt embedding 450 is learned is shown. The training process 400*a* may execute on the remote system 60 of FIG. 1. As shown, the training process 400*a* initializes a prompt embedding 450 as a fixed-length sequence of learnable vectors (e.g., 20 tokens long), and receives one or more training datasets 420 stored in a training data store 410 and trains the assistant LLM 220 on one or more of the training datasets 420 to generate the fine-tuned user prompt embedding 450. The training data store 410 may reside on the memory hardware 64 of the remote system 60. Each training dataset 420 includes natural language training utterances 430, 430*a-n*, where each natural language training utterance 430 includes a corresponding textual representation 432 of the natural language training utterance 430 and a corresponding ground-truth emotional state 434 of the natural language training utterance 430. Here, for each natural language training utterance 430 in the training dataset 420, the training process 400*a* processes, using the assistant LLM 220, the corresponding textual representation 432 of the natural language training utterance 430 to generate a corresponding predicted emotional state 232P for the natural language training utterance 430 as output from the assistant LLM 220. The corresponding textual representation 432 of the natural language training utterance 430 may also be conditioned on the emotion detection task prompt 214 that specifies the task for the assistant LLM 220 to detect the emotional state 232P of the corresponding textual representation 432 of the natural language training utterance 430 from a set of possible emotional states 232.

A loss module 440 for the training process 400*a* receives, as input, the corresponding ground-truth emotional state 434 of the natural language training utterance 430 and the corresponding predicted emotional state 232P for the natural language training utterance 430 as output from the assistant LLM 220 and determines a training loss 442 based on the corresponding predicted emotional state 232P and the corresponding ground-truth emotional state 434 of the natural language training utterance 430. Thereafter, the training process 400*a* fine-tunes, using the training loss 442, the fine-tuned prompt embedding 450 by updating the learnable vectors while parameters of the assistant LLM 220 are kept fixed. By keeping the parameters of the assistant LLM 220 fixed, the fine-tuned prompt embedding 450 extracts evidence about how to perform the task of detecting an emotion from input text from the training dataset 420, and, as such, performs the same role as a manually written text prompt without the constraints of discrete language.

Figure 4B:
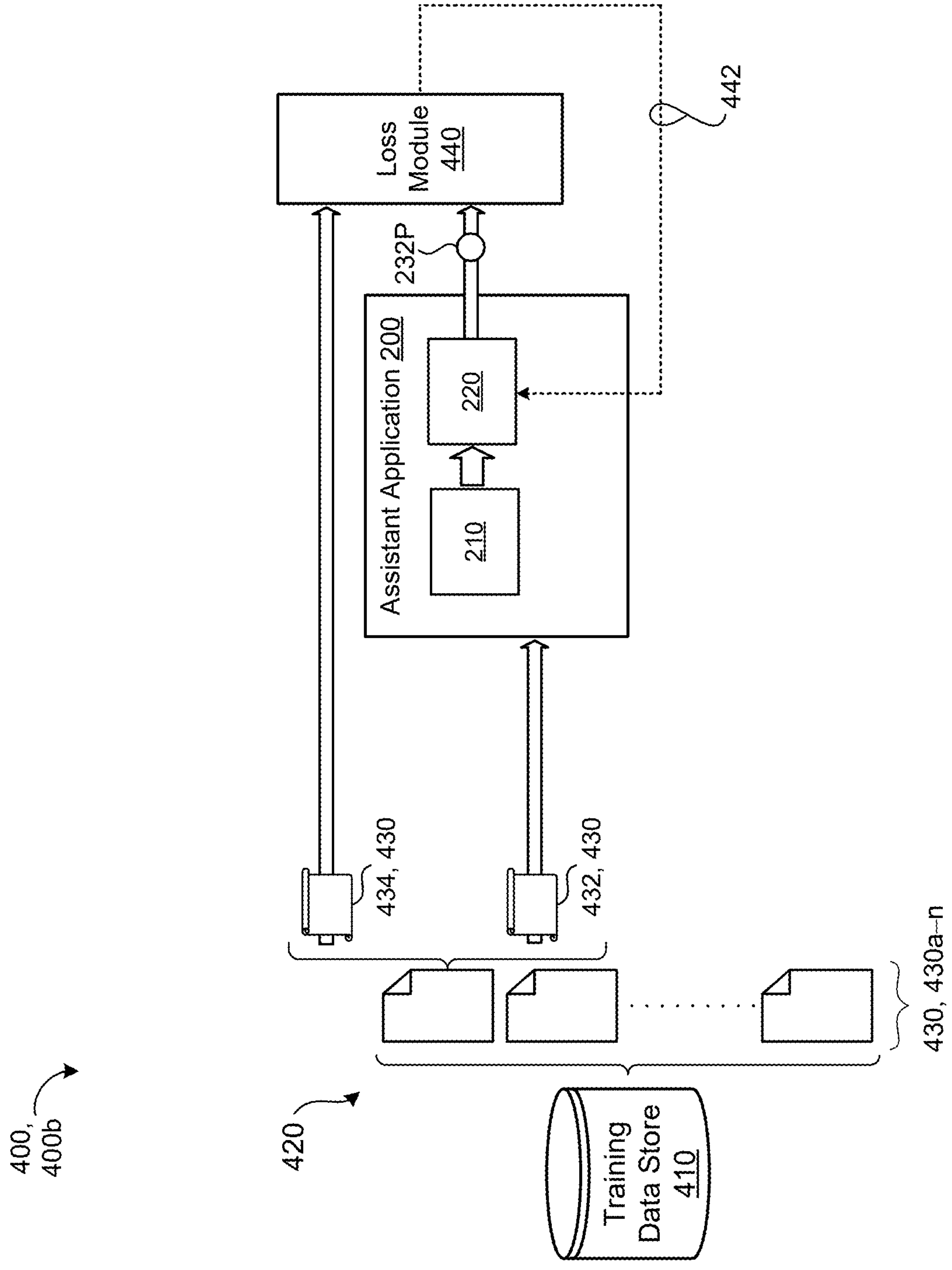
FIG. 4B is a schematic view of example training process for fine-tuning the LLM to learn consistent predictions.

With reference to FIG. 4B, an example training process 400, 400*b* for training the assistant LLM 220 to learn to predict emotional states is shown. In particular, the assistant LLM 220 includes a pre-trained LLM 220 and the training process 400*b* uses a low-rank adaption (LoRA) training process to fine-tune a fraction of the parameters of the pre-trained LLM 220 to learn to predict emotional states of input texts. The training process 400*b* may execute on the remote system 60 of FIG. 1. Like in the training process 400*a*, the training process 400*b* receives one or more training datasets 420 stored in a training data store 410 and fine-tunes the fraction of the pre-trained LLM 220 on one or more of the training datasets 420. Each training dataset 420 includes natural language training utterances 430, 430*a-n*, where each natural language training utterance 430 includes a corresponding textual representation 432 of the natural language training utterance 430 and a corresponding ground-truth emotional state 434 of the natural language training utterance 430. Here, for each natural language training utterance 430 in the training dataset 420, the training process 400*a* processes, using the assistant LLM 220, the corresponding textual representation 432 of the natural language training utterance 430 to generate a corresponding predicted emotional state 232P for the natural language training utterance 430 as output from the assistant LLM 220. The corresponding textual representation 432 of the natural language training utterance 430 may also be conditioned on the emotion detection task prompt 214 that specifies the task for the assistant LLM 220 to detect the emotional state 232P of the corresponding textual representation 432 of the natural language training utterance 430 from a set of possible emotional states 232.

A loss module 440 for the training process 400*b* receives, as input, the corresponding ground-truth emotional state 434 of the natural language training utterance 430 and the corresponding predicted emotional state 232P for the natural language training utterance 430 as output from the assistant LLM 220 and determines a training loss 442 based on the corresponding predicted emotional state 232P and the corresponding ground-truth emotional state 434 of the natural language training utterance 430. Thereafter, the training process 400*a* fine-tunes, using the training loss 442, the fraction of the parameters of the assistant LLM 220 while a remaining portion of the parameters of the fine-tuned prompt embedding 450 by updating the learnable vectors while parameters of the assistant LLM 220 are kept fixed.

Referring again to FIG. 2, after the assistant LLM 220 detects an emotional state 232P of the input text 202 from the set of possible emotional states 232, the conversational assistant application 200 (e.g., via the assistant LLM 220) determines, based on the emotional state 232P of the natural language response predicted as output from the assistant LLM 220, an emotional embedding $E_E$ 242 for the input text 202.

Here, the emotional embedding $E_E$ 242 specifies the emotional state 232P of the natural language response for synthesizing the input text 202 into expressive speech. As described above, the emotional embedding 242 may be a controllable feature that the TTS model 300 uses to synthesize speech with different emotional states 232. For example, determining the emotional embedding 242 specifying the emotional state 232P of the natural language response for synthesizing the input text 202 into expressive speech may include accessing a two-dimensional (2-dimensional) embedding space that maps each respective emotional state 232 from the set of possible emotional states 232 to a different respective emotional embedding 242. Each emotional embedding $E_E$ 242 may specify a style/prosody and may be provided to an end-to-end TTS model 300 for converting the input text 202 into synthesized speech 352 having the style/prosody specified by the emotional embedding $E_E$ 242.

Figure 3:
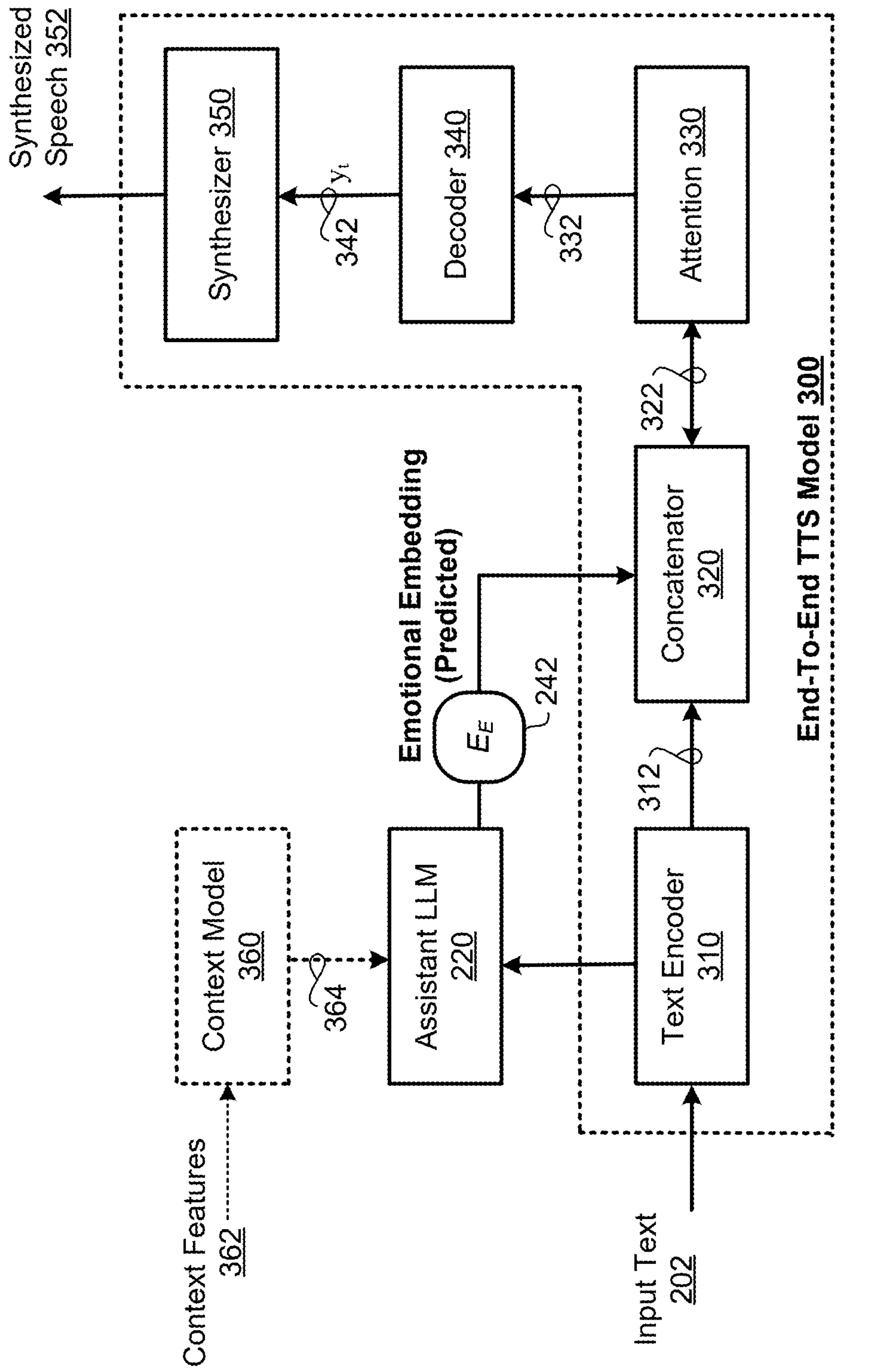
FIG. 3 is a schematic view of a TTS system of the assistant LLM.

With particular reference to FIG. 3, the TTS model 300 is configured to receive the input text 202 and the emotional embedding $E_E$ 242 and process the input text 202 and the emotional embedding $E_E$ 242 to generate the synthesized speech representation 352 of the natural language response that conveys the emotional state 232P of the natural language response as specified by the emotional embedding $E_E$ 242. The TTS model 300 includes an encoder 310, a concatenator 320, an attention module 330, a decoder 340, and a synthesizer 350. In some implementations, the encoder 310, the attention module 330, and the decoder 340 collectively correspond to a seq2seq recurrent neural network and the synthesizer 350 may include a waveform synthesizer or a WaveNet neural vocoder. However, the choice of synthesizer 350 has no impact on the resulting prosody and/or style of the synthesized speech 352, and in practice, only impacts audio fidelity of the synthesized speech 352. The attention module 330 may include Gaussian Mixture Model (GMM) attention to improve generalization to long utterances. Accordingly, the encoder 310 of the TTS model 300 may use a CBHG neural network to encode the input text 202 into an encoded sequence 312 that is fed to the concatenator 320. The emotional embedding $E_E$ 242 output from the assistant LLM 220 is also fed to the concatenator 320 and the concatenator 320 is configured to generate a concatenation 322 between the respective encoded sequence 312 of the input text 522 and the emotional embedding $E_E$ 242. In some examples, the concatenator 320 includes a broadcast concatenator. In some implementations, the attention module 330 is configured to convert the concatenation 322 to a fixed-length context vector 332 for each output step of the decoder 340 to produce the output audio signal 342, $y_t$ which is received by the synthesizer 350 that is configured to synthesize the output audio signal 342 to output the synthesized speech representation 352 conveying the emotional state 232P of the natural language response as specified by the emotional embedding $E_E$ 242.

In some implementations, a context model 360 in communication with the assistant LLM 220 is configured to receive and process one or more context features 362 to generate a context embedding 364 associated with the input text 202. For example, the context features 362 may include the conversation history between the user 102 and the conversational assistant application 200 as context to the assistant LLM 220. By receiving historical context (e.g., via the context embedding 364), the assistant LLM 220 may be more efficiently perform the task of predicting the emotional state 232 of the input text 202. For example, the historical emotional states 232 (e.g., the previously predicted emotional states 232P from previous conversation turns) may better inform the assistant LLM 220 on the tone and/or emotion of the conversation between the user 102 and the assistant LLM 220.

Figure 5:
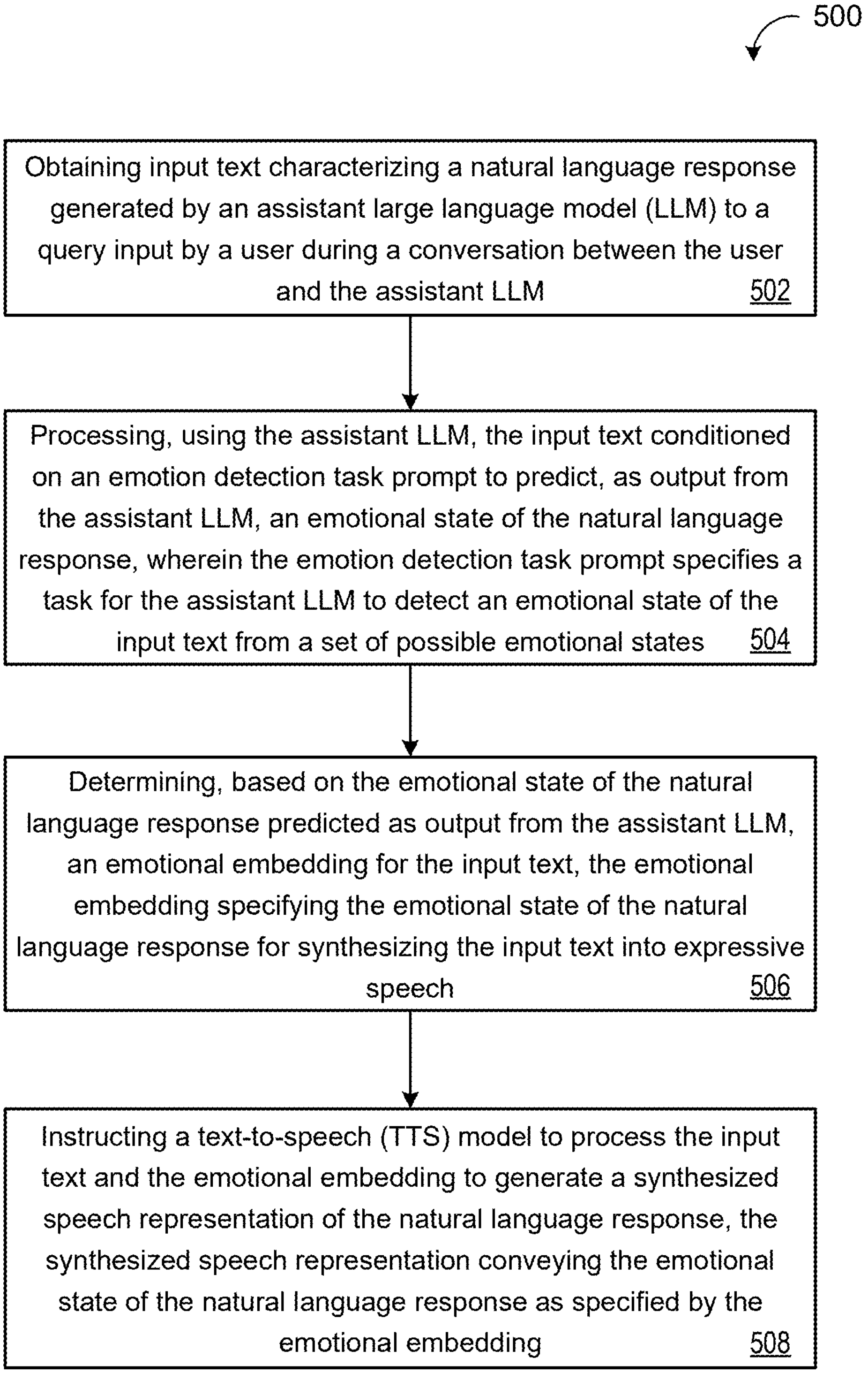
FIG. 5 is a flowchart of an example arrangement of operations for a method for emotive TTS and automatic emotion detection using an assistant LLM system.

FIG. 5 shows a flowchart of an example arrangement of operations for a method 500 of generating a synthesized speech representation 352 conveying an emotional state 242 of a input text 202 characterizing a natural language response to a query input 106. The method 500 may be described with reference to FIGS. 1-3. Data processing hardware (e.g., data processing hardware 12, 62 of FIG. 1) may execute instructions stored on memory hardware (e.g., memory hardware 12, 64 of FIG. 1) to perform the example arrangement of operations for the method 500.

At operation 502, the method 500 includes obtaining input text 202 characterizing a natural language response generated by an assistant large language model (LLM) 220 to a query input 106 by a user 102 during a conversation between the user 102 and the assistant LLM 220. The method 500 also includes, at operation 504, processing, using the assistant LLM 220, the input text 202 conditioned on an emotion detection task prompt 214 to predict, as output from the assistant LLM 220, an emotional state 232 of the natural language response. Here, the emotion detection task prompt 214 specifies a task for the assistant LLM 220 to detect an emotional state 232 of the input text 202 from a set of possible emotional states 232.

At operation 506, the method 500 also includes determining, based on the emotional state 232 of the natural language response predicted as output from the assistant LLM 220, an emotional embedding 242 for the input text 202. Here, the emotional embedding 242 specifies the emotional state 232 of the natural language response for synthesizing the input text 202 into expressive speech. At operation 508, the method 500 further includes instructing a text-to-speech (TTS) model 300 to process the input text 202 and the emotional embedding 242 to generate a synthesized speech representation 352 of the natural language response, the synthesized speech representation 352 conveying the emotional state 232 of the natural language response as specified by the emotional embedding 242.

Figure 6:
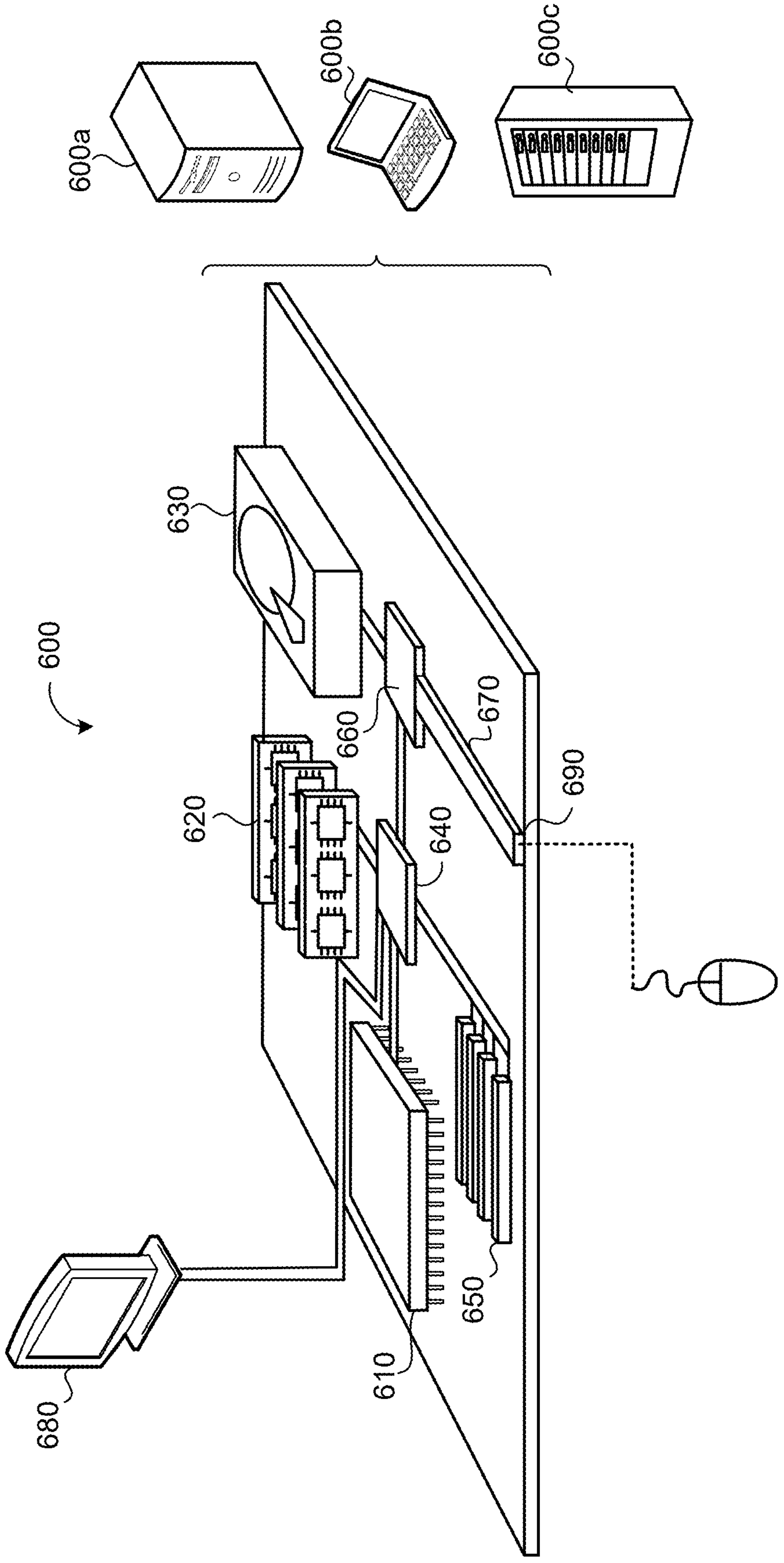
FIG. 6 is a schematic view of an example computing device that may be used to implement the systems and methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 (e.g., the data processing hardware 12, 62 of FIG. 1) can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 (e.g., the memory hardware 14, 64 of FIG. 1) stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600*a* or multiple times in a group of such servers 600*a*, as a laptop computer 600*b*, or as part of a rack server system 600*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed on data processing hardware that causes the data processing hardware to perform operations comprising:

obtaining input text characterizing a natural language response generated by an assistant large language model (LLM) to a query input by a user during a conversation between the user and the assistant LLM;

receiving a fine-tuned prompt embedding, the fine-tuned prompt embedding comprising a soft prompt configured to guide the assistant LLM to detect an emotional state of the input text from a set of possible emotional states while parameters of the assistant LLM are held fixed;

processing, using the assistant LLM, the input text conditioned on an emotion detection task prompt and the fine-tuned prompt embedding to predict, as output from the assistant LLM, an emotional state of the natural language response, wherein the emotion detection task prompt specifies a task for the assistant LLM to detect the emotional state of the input text from the set of possible emotional states;

determining, based on the emotional state of the natural language response predicted as output from the assistant LLM, an emotional embedding for the input text, the emotional embedding specifying the emotional state of the natural language response for synthesizing the input text into expressive speech; and instructing a text-to-speech (TTS) model to process the input text and the emotional embedding to generate a synthesized speech representation of the natural language response, the synthesized speech representation conveying the emotional state of the natural language response as specified by the emotional embedding.

2. The method of claim 1, wherein the operations further comprise:

receiving audio data characterizing an utterance of the query spoken by the user in natural language and captured by a user device; and performing speech recognition on the audio data to generate a textual representation of the query spoken by the user.

3. The method of claim 1, wherein the fine-tuned prompt embedding is learned during a prompt embedding fine-tuning process by:

initializing a prompt embedding as fixed-length sequence of learnable vectors;

receiving a training dataset of natural language training utterances, each natural language training utterance comprising:

a corresponding textual representation of the natural language training utterance; and a corresponding ground-truth emotional state of the natural language training utterance; and for each natural language training utterance in the training dataset:

processing, using the assistant LLM, the corresponding textual representation of the natural language training utterance to generate a corresponding predicted emotional state for the natural language training utterance as output from the assistant LLM;

determining a training loss based on the corresponding predicted emotional state and the corresponding ground-truth emotional state of the natural language training utterance; and tuning, using the training loss, the prompt embedding by updating the learnable vectors while parameters of the assistant LLM are kept fixed.

4. The method of claim 1, wherein:

obtaining the input text characterizing the natural language response comprises processing, using the assistant LLM, a textual representation of the query input by the user to generate, as output from the assistant LLM, the input text characterizing the natural language response to the query; and processing the input text conditioned on the emotion detection task prompt and the fine-tuned prompt embedding to predict the emotional state of the natural language response comprises, after the input text characterizing the natural language response to the query is output from the assistant LLM and provided as feedback to the assistant LLM, processing, using the assistant LLM, the input text conditioned on the emotion detection prompt and the fine-tuned prompt embedding to predict, as output from the assistant LLM, the emotional state of the natural language response.

5. The method of claim 1, wherein:

obtaining the input text characterizing the natural language response comprises processing, using the assistant LLM, a textual representation of the query input by the user to generate the input text characterizing the natural language response to the query; and processing the input text conditioned on the emotion detection task prompt and the fine-tuned prompt embedding to predict the emotional state of the natural language response comprises processing, using the assistant LLM, the input text conditioned on the emotion detection task prompt and the fine-tuned prompt embedding to:

predict the emotional state of the natural language response; and generate, as output, from the assistant LLM, marked-up text that includes the input text characterizing the natural language response annotated with the predicted emotional state of the natural language response.

6. The method of claim 1, wherein determining the emotional embedding specifying the emotional state of the natural language response for synthesizing the input text into expressive speech comprises accessing a two-dimensional embedding space that maps each respective emotional state from the set of possible emotional states to a different respective emotional embedding.

7. A computer-implemented method executed on data processing hardware that causes the data processing hardware to perform operations comprising:

obtaining input text characterizing a natural language response generated by an assistant large language model (LLM) to a query input by a user during a conversation between the user and the assistant LLM, wherein the assistant LLM comprises a pre-trained LLM and a low-rank adaption training process fine-tunes a fraction of parameters of the pre-trained LLM to learn how to predict emotional states of input texts;

processing, using the assistant LLM, the input text conditioned on an emotion detection task prompt to predict, as output from the assistant LLM, an emotional state of the natural language response, wherein the emotion detection task prompt specifies a task for the assistant LLM to detect an emotional state of the input text from a set of possible emotional states;

determining, based on the emotional state of the natural language response predicted as output from the assistant LLM, an emotional embedding for the input text, the emotional embedding specifying the emotional state of the natural language response for synthesizing the input text into expressive speech; and instructing a text-to-speech (TTS) model to process the input text and the emotional embedding to generate a synthesized speech representation of the natural language response, the synthesized speech representation conveying the emotional state of the natural language response as specified by the emotional embedding, wherein the low-rank adaption training process fine-tunes the fraction of the pre-trained LLM by:

receiving a training dataset of natural language training utterances, each natural language training utterance comprising:

a corresponding textual representation of the natural language training utterance; and a corresponding ground-truth emotional state of the natural language training utterance; and for each natural language training utterance in the training dataset:

processing, using the assistant LLM, the corresponding textual representation of the natural language training utterance to generate a corresponding predicted emotional state for the natural language training utterance as output from the assistant LLM; and determining a training loss based on the corresponding predicted emotional state and the corresponding ground-truth emotional state of the natural language training utterance; and fine-tuning, using the training losses, the fraction of the parameters of the assistant LLM while a remaining portion of the parameters of the assistant LLM are kept fixed.

8. A system comprising:

data processing hardware; and memory hardware in communication with the data processing hardware, the memory hardware storing instructions that when executed on the data processing hardware cause the data processing hardware to perform operations comprising:

obtaining input text characterizing a natural language response generated by an assistant large language model (LLM) to a query input by a user during a conversation between the user and the assistant LLM;

receiving a fine-tuned prompt embedding, the fine-tuned prompt embedding comprising a soft prompt configured to guide the assistant LLM to detect an emotional state of the input text from a set of possible emotional states while parameters of the assistant LLM are held fixed;

processing, using the assistant LLM, the input text conditioned on an emotion detection task prompt and the fine-tuned prompt embedding to predict, as output from the assistant LLM, an emotional state of the natural language response, wherein the emotion detection task prompt specifies a task for the assistant LLM to detect the emotional state of the input text from the set of possible emotional states;

determining, based on the emotional state of the natural language response predicted as output from the assistant LLM, an emotional embedding for the input text, the emotional embedding specifying the emotional state of the natural language response for synthesizing the input text into expressive speech; and instructing a text-to-speech (TTS) model to process the input text and the emotional embedding to generate a synthesized speech representation of the natural language response, the synthesized speech representation conveying the emotional state of the natural language response as specified by the emotional embedding.

9. The system of claim 8, wherein the operations further comprise:

receiving audio data characterizing an utterance of the query spoken by the user in natural language and captured by a user device; and performing speech recognition on the audio data to generate a textual representation of the query spoken by the user.

10. The system of claim 8, wherein the fine-tuned prompt embedding is learned during a prompt embedding fine-tuning process by:

initializing a prompt embedding as fixed-length sequence of learnable vectors;

receiving a training dataset of natural language training utterances, each natural language training utterance comprising:

a corresponding textual representation of the natural language training utterance; and a corresponding ground-truth emotional state of the natural language training utterance; and for each natural language training utterance in the training dataset:

processing, using the assistant LLM, the corresponding textual representation of the natural language training utterance to generate a corresponding predicted emotional state for the natural language training utterance as output from the assistant LLM;

determining a training loss based on the corresponding predicted emotional state and the corresponding ground-truth emotional state of the natural language training utterance; and tuning, using the training loss, the prompt embedding by updating the learnable vectors while parameters of the assistant LLM are kept fixed.

11. The system of claim 8, wherein:

obtaining the input text characterizing the natural language response comprises processing, using the assistant LLM, a textual representation of the query input by the user to generate, as output from the assistant LLM, the input text characterizing the natural language response to the query; and processing the input text conditioned on the emotion detection task prompt and the fine-tuned prompt embedding to predict the emotional state of the natural language response comprises, after the input text characterizing the natural language response to the query is output from the assistant LLM and provided as feedback to the assistant LLM, processing, using the assistant LLM, the input text conditioned on the emotion detection prompt and the fine-tuned prompt embedding to predict, as output from the assistant LLM, the emotional state of the natural language response.

12. The system of claim 8, wherein:

obtaining the input text characterizing the natural language response comprises processing, using the assistant LLM, a textual representation of the query input by the user to generate the input text characterizing the natural language response to the query; and processing the input text conditioned on the emotion detection task prompt and the fine-tuned prompt embedding to predict the emotional state of the natural language response comprises processing, using the assistant LLM, the input text conditioned on the emotion detection task prompt and the fine-tuned prompt embedding to:

predict the emotional state of the natural language response; and generate, as output, from the assistant LLM, marked-up text that includes the input text characterizing the natural language response annotated with the predicted emotional state of the natural language response.

13. The system of claim 8, wherein determining the emotional embedding specifying the emotional state of the natural language response for synthesizing the input text into expressive speech comprises accessing a two-dimensional embedding space that maps each respective emotional state from the set of possible emotional states to a different respective emotional embedding.

14. A system comprising:

data processing hardware; and memory hardware in communication with the data processing hardware, the memory hardware storing instructions that when executed on the data processing hardware cause the data processing hardware to perform operations comprising:

obtaining input text characterizing a natural language response generated by an assistant large language model (LLM) to a query input by a user during a conversation between the user and the assistant LLM, wherein the assistant LLM comprises a pre-trained LLM and a low-rank adaption training process fine-tunes a fraction of parameters of the pre-trained LLM to learn how to predict emotional states of input texts;

processing, using the assistant LLM, the input text conditioned on an emotion detection task prompt to predict, as output from the assistant LLM, an emotional state of the natural language response, wherein the emotion detection task prompt specifies a task for the assistant LLM to detect an emotional state of the input text from a set of possible emotional states;

determining, based on the emotional state of the natural language response predicted as output from the assistant LLM, an emotional embedding for the input text, the emotional embedding specifying the emotional state of the natural language response for synthesizing the input text into expressive speech; and instructing a text-to-speech (TTS) model to process the input text and the emotional embedding to generate a synthesized speech representation of the natural language response, the synthesized speech representation conveying the emotional state of the natural language response as specified by the emotional embedding, wherein the low-rank adaption training process fine-tunes the fraction of the pre-trained LLM by:

receiving a training dataset of natural language training utterances, each natural language training utterance comprising:

a corresponding textual representation of the natural language training utterance; and a corresponding ground-truth emotional state of the natural language training utterance; and for each natural language training utterance in the training dataset:

processing, using the assistant LLM, the corresponding textual representation of the natural language training utterance to generate a corresponding predicted emotional state for the natural language training utterance as output from the assistant LLM; and determining a training loss based on the corresponding predicted emotional state and the corresponding ground-truth emotional state of the natural language training utterance; and fine-tuning, using the training losses, the fraction of the parameters of the assistant LLM while a remaining portion of the parameters of the assistant LLM are kept fixed.

* * * * *